(12) United States Patent
Xiang et al.

(10) Patent No.: US 9,077,034 B2
(45) Date of Patent: Jul. 7, 2015

(54) HIGH MANGANESE POLYCRYSTALLINE ANODE MATERIAL, PREPARATION METHOD THEREOF AND DYNAMIC LITHIUM ION BATTERY

(75) Inventors: Qianxin Xiang, Shenzhen (CN); Xiaolian Zhao, Shenzhen (CN)

(73) Assignees: SHEN ZHEN ZHENHUA NEW MATERIAL CO., LTD., Shenzhen, Guangdong (CN); GUIZHOU ZHENHUA NEW MATIERAL CO., LTD., Guiyang, Guizhou (CN)

( * ) Notice: Subject to any disclaimer, the term of this patent is extended or adjusted under 35 U.S.C. 154(b) by 879 days.

(21) Appl. No.: 13/138,944

(22) PCT Filed: Dec. 27, 2009

(86) PCT No.: PCT/CN2009/076101
§ 371 (c)(1),
(2), (4) Date: Oct. 28, 2011

(87) PCT Pub. No.: WO2011/075921
PCT Pub. Date: Jun. 30, 2011

(65) Prior Publication Data
US 2012/0045690 A1  Feb. 23, 2012

(51) Int. Cl.
*H01M 4/13* (2010.01)
*H01M 4/505* (2010.01)
(Continued)

(52) U.S. Cl.
CPC ........... *H01M 4/505* (2013.01); *C01P 2002/72* (2013.01); *C01P 2004/03* (2013.01); *C01P 2004/61* (2013.01); *H01M 4/525* (2013.01);
(Continued)

(58) Field of Classification Search
CPC ..... H01M 4/505; H01M 4/525; H01M 4/364; H01M 10/0525; C01G 45/1242; C01G 51/42; C01G 53/42; C01G 53/44; C01P 2002/72; C01P 2004/61; C01P 2002/54; C01P 2004/45; C01P 2004/51; C01P 2004/62; C01P 2004/80; Y02E 60/122
USPC .................................. 429/211, 77; 252/182.1
See application file for complete search history.

(56) References Cited

U.S. PATENT DOCUMENTS

2004/0258984 A1* 12/2004 Ariel et al. .................... 429/152

*Primary Examiner* — Gary Harris
(74) *Attorney, Agent, or Firm* — Raymond Y. Chan; David and Raymond Patent Firm

(57) ABSTRACT

Provided are a high manganese polycrystalline anode material, preparation method thereof and dynamic lithium ion battery. The general formula of the high manganese polycrystalline anode material is LiwMnx(CoNi)yOz, wherein x=0.4-2.0, y=0.1-0.6, x+y<2, z≥2, and w≥1. The weight of Mn is not less than 40% of the weight of LiwMnx(CoNi)yOz, and the particle size thereof is 7-20 microns. The high manganese polycrystalline anode material has more than two lattice structures selected from $LiMn_2O_4$, $LiCO_n(NiMn)_{1-n}O_2$, $LiNi_{0.8}Co_{0.2}O_2$, $LiCoO_2$, $LiNi_nMn_{1-n}O_2$, $LiMn_{2n}Ni_{2(1-n)}O_4$ and $LiNiO_2$, which are in mixed state or intergrowth state, wherein n<1. The specific energy of the anode material is more than 155 Wh/K, the conservation rate of the capacity is not less than 80% after 500 charging and discharging circles when the charging and discharging multiplying dynamic is 1C and at 55° C., and at 25° C., its cycle life is not less than 1000 times and the conservation rate of the capacity is more than 80%. The processability of the anode material is good.

5 Claims, 22 Drawing Sheets

(51) Int. Cl.
  *H01M 4/525* (2010.01)
  *C01G 45/12* (2006.01)
  *C01G 51/00* (2006.01)
  *C01G 53/00* (2006.01)
  *H01M 4/36* (2006.01)
  H01M 4/131 (2010.01)
  H01M 10/0525 (2010.01)

(52) U.S. Cl.
  CPC ............ *Y02E 60/122* (2013.01); *C01G 45/1242* (2013.01); *C01G 51/42* (2013.01); *C01G 53/42* (2013.01); *C01G 53/44* (2013.01); *C01P 2002/54* (2013.01); *C01P 2004/45* (2013.01); *C01P 2004/51* (2013.01); *C01P 2004/62* (2013.01); *C01P 2004/80* (2013.01); *C01P 2006/12* (2013.01); *C01P 2006/40* (2013.01); *H01M 4/131* (2013.01); *H01M 4/364* (2013.01); *H01M 10/0525* (2013.01)

HIGH MANGANESE POLYCRYSTALLINE ANODE MATERIAL, PREPARATION METHOD THEREOF AND DYNAMIC LITHIUM ION BATTERY

BACKGROUND OF THE PRESENT INVENTION

1. Field of Invention

The present invention relates to a kind of anode material, its preparation method thereof and a dynamic lithium ion battery, and more particularly to a high manganese polycrystalline anode material and its preparation method thereof, and a dynamic lithium ion battery which makes use of the aforesaid material.

2. Description of Related Arts

Recently, dynamic lithium-ion battery has developed at a fast pace. The function, cost and safety of dynamic battery are the major determining factors in development of electric vehicles. Nevertheless, new energy vehicles which involves wind energy, nuclear energy, solar energy and power cycling have never departed from dynamic battery of which any breakthrough in dynamic battery will bring forward the development of a whole new energy chain development and the dynamic battery becomes the energy storage tool for different new energy sources which replaces fuel as the major energy supply for mobile energy. Electric vehicles are the new type of transportation tool which is energy saving and convenience and are recognized by consumer gradually. In 2007, the ownership of electric vehicles in China has exceeded 20 millions which indicated an unprecedented fast development of electric vehicles. However, numerous problems such as safety and environmental issues which are the prioritized issues are co-existed with the development. At present, the electric vehicles in mainland China still utilize lead-acid batteries of which the problems of low density and high pollution are gradually discovered by people. Accordingly, the race of finding new substitutes becomes a new industry direction at worldwide level. Secondly, Ni-MH battery has advantages of mature technology, convenience and low cost in view of purchase and utilization, and low pollution but unavoidable disadvantages of memory effect which poses great inconvenience in utilization. In addition, Ni-MH battery has high self-discharge rate and low specific energy, therefore the Ni-MH battery can only be used as transition product. In view of the existence and development of Li-ion battery which has numerous advantages such as high power, Li-ion battery gradually replaces Ni-MH battery for energy storage. The Li-ion battery has the following characteristics: 1) high operating voltage which is 3.6V or above, which is three times higher compared to Ni-MH battery; 2) small in volume, which is 30% smaller compared to Ni-MH battery; 3) low density, which is 50% lighter compared to Ni-MH battery; 4) high specific energy of 120~150 wh/kg, which is 2~3 times higher compared to Cadnium-Nickel battery and is 1~2 times higher compared to Ni-MH battery; 5) Absence of memory effect.

Lithium cobalt oxide is the earliest anode materials with mature industry standard which has high energy density, good cycle performance but has drawbacks of high cost and low safety which limited its use in mobile battery. Cobalt-Nickel-Manganese anode materials provide advantages of high energy density and superior cycling performance but the problems of safety and cost remain as the obstacles in the application in mobile battery. Nowadays, the research direction of anode materials for dynamic battery is still focused on lithium iron phosphate and lithium manganese. Lithium manganese has the advantages of low cost and high safety level while having problems of poor cycling performance under high temperature and serious problem of self-discharging effect. Even doping of Co, Ni, Mg, Al are applied for modification, the cost has greatly affected its independent application in mobile battery. Cobalt-Nickel-Manganese anode material basically has superior safety level. However, the control of preparation conditions is complicated and therefore the resulting products have low consistency, low energy density while the cost is high. As a result, the application of Cobalt-Nickel-Manganese anode material should be further improved. Accordingly, the research of anode material with low cost, high safety level and high longevity are important to dynamic battery and to the future development of electric vehicle industry.

SUMMARY OF THE PRESENT INVENTION

An object of the present invention is to provide a high manganese polycrystalline anode material and its preparation method thereof as well as a dynamic lithium ion battery such that the technical problems can be solved through increasing the energy density and improving the cycling performance under high temperature of the battery.

Additional advantages and features of the invention will become apparent from the description which follows, and may be realized by means of the instrumentalities and combinations particular point out in the appended claims.

According to the present invention, the foregoing and other objects and advantages are attained by the followings: a high manganese polycrystalline anode material, wherein the high manganese polycrystalline anode material has a general formula of $Li_wMn_x(CoNi)_yO_z$, where $x=0.4\sim2.0$, $y=0.1\sim0.6$, $x+y<2$, $z\geq2$, $W\geq1$, the weight of Mn≥the weight of 40% $Li_wMn_x(CoNi)_yO_z$, the grain size is between 7~20 micron, wherein the high manganese polycrystalline anode material has two or more lattice structures selected from the group consisting of $LiMn_2O_4$, $LiCo_n(NiMn)_{1-n}O_2$, $LiNi_{0.8}Co_{0.2}O_2$, $LiCoO_2$, $LiNi_nMn_{1-n}O_2$, $LiMn_{2n}Ni_{2(1-n)}O_4$ and $LiNiO_2$, wherein the crystalline phase includes mixed state and intergrowth state, where $n<1$.

According to the present invention, the content of Mn constitutes 60~90% of the total molar volume of Co+Ni+Mn.

According to the present invention, the lattice structure includes one or more doping elements selected from the group consisting of Al, Si, Ti, Fe, Zr, Mg and Cr, wherein the doping concentration is 0.01~0.1 mol/mol $Li_wMn_x(CoNi)_yO_z$.

A preparation method of high manganese polycrystalline anode material, comprising the following steps of: (1) preparation of precursor: provide 0.3~1.2 mol of Li element in $Li_2CO_3$, LiAc or LiOH, disperse in 200~300 ml aqueous colloid of 2~5% polyethylene glycol with speed of 10~60 rin/min and time of 50~120 min to form a colloid, add cobalt-nickel-manganese compound into the colloid based on the molar ratio of Mn to Ni+Co: 0.4~2.0:0.01~0.6, with speed of 50~60 rin/min and time of 10~30 min, after drying under 150~600° C. for 2~15 hours with speed of 1500~3000 rin/min and time of 2~30 min, obtain Li and Co—Ni—Mn crystalline precursor; (2) formation of single crystalline structure: allowing agglomeration of the crystalline precursor under 750~1000° C. for 4~15 hours, cooling and breaking until the particle size D50=7~20 micron, obtaining single crystal compound of $LiMn_2O_4$, $LiCO_n(NiMn)_{1-n}O_2$, $LiNi_{0.8}Co_{0.2}O_2$, $LiCoO_2$, $LiNi_nMn_{1-n}O_2$, $LiMn_{2n}Ni_{2(1-n)}O_4$ or $LiNiO_2$, where $n<1$; (3) formation of polycrystalline structure: mixing two or more single crystalline structure to form a mixture, where the content of Mn constitutes 60~90% of the total molar volume of Co+Ni+Mn, the speed is 100~150 rin/min and the time is 5~20 min, dissolving one or more 0.01~0.1 mol soluble salt selecting from the group of Al, Si, Ti, Fe, Zr Mg and Cr into 100~300 ml 30~60% ethanol solution, adding the mixture, mixing under the speed of 60~100 rin/min and the time of 30~60 min, drying under 100~200° C. for 2~10 hours, heating to 300~850° C. at heating rate of 50~100° C./hr, allowing activation for 2~10 hours to obtain crystalline phase at mixed state or intergrowth state.

According to the preparation method of the present invention, the product in crystalline phase at intergrowth state is then crushed.

According to the preparation method of the present invention, the product in crystalline phase at mixed state or intergrowth state is then grinded by ball milling with a rotational speed of 1500~3000 rin/min and a time of 2~5 min.

According to the preparation method of the present invention, the cobalt-nickle-manganese compound is hydroxy compound, oxalate or carbonate.

According to the preparation method of the present invention, the precursor carries out agglomeration under 750~1000° C. for 4~15 hours, which is then cooled naturally.

A dynamic Li-ion battery which includes an anode, wherein the anode includes a collector on which an anode active substance is coated, wherein the anode active substance is $Li_wMn_x(CoNi)_yO_z$, where x=0.4~2.0, y=0.1~0.6, x+y<2, z≥2, W≥1, the lattice structure includes one or more doping elements of Al, Si, Ti, Fe, Zr, Mg and Cr, wherein the doping concentration is 0.01~0.1 mol/mol $Li_wMn_x(CoNi)_yO_z$, the weight of Mn≥the weight of 40% $Li_wMn_x(CoNi)_yO_z$, the content of Mn constitutes 60~90% of the total molar volume of Co+Ni+Mn, the grain size is between 7~20 micron, the XRD reveals that the high manganese polycrystalline anode material has two or more lattice structures selected from the group consisting of $LiMn_2O_4$, $LiCO_n(NiMn)_{1-n}O_2$, $LiNi_{0.8}Co_{0.2}O_2$, $LiCoO_2$, $LiNi_nMn_{1-n}O_2$, $LiMn_{2n}Ni_{2(1-n)}O_4$ and $LiNiO_2$, wherein the crystalline phase includes mixed state and intergrowth state, where n<1.

According to the present invention, the anode materials of the battery can be prepared as follows: providing $Li_wMn_x(CoNi)_yO_z$, mixing conductive carbon black which constitutes to 2.0~3.0% of mass ratio of the anode material with adhesive PVDF which constitutes to 2.0~2.5% of mass ratio to form a mixture material, then adding N-methylpyrrolidone (NMP) based on a mass ratio of the mixture material to NMP of 1:0.9, mixing uniformly to form a paste material, applying the paste material onto the aluminum foil collector, drying and pressing into an anode plate.

Compared to conventional technology, the present invention employs a polycrystalline structure with high content level of manganese. The anode material has a specific energy which is greater than 155 Wh/kg, a discharge rate of 1C at 55° C. with a capacity retention rate ≥80% after 500 cycles, and at 25° C. with a cycle life ≥1000 cycles and a capacity retention rate ≥80%, can be applied in system having high voltage and has a charging voltage ≥4.3V. The material has good processing performance, and the electrode plate does not fall off and is relatively light, which is ¼ to ⅕ of the weight of the lead-acid battery with the same power. The dynamic battery which employs the above material can be used in the power system of bicycle, the power system of electric vehicle, and energy storage system in industries driven through wind power, nuclear power, solar power and power cycling.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
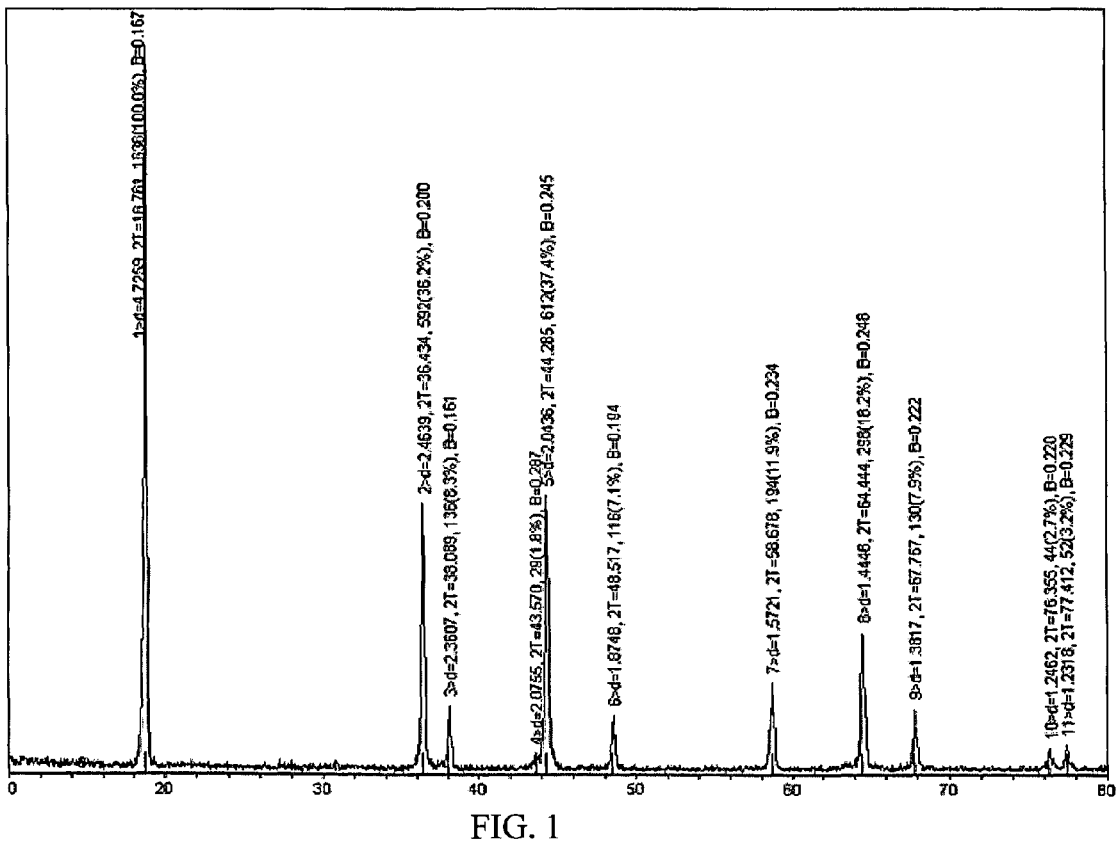
FIG. 1 is a spectrum showing an X-ray diffraction pattern according to a first embodiment of a preferred embodiment of the present invention.

The present invention is further described through the following exemplary embodiments and the accompanying drawings. According to a preferred embodiment of the present invention, a high manganese polycrystalline anode material is provided which has a general formula of $Li_wMn_x(CoNi)_yO_z$, where $x=0.4\sim2.0$, $y=0.1\sim0.6$, $x+y<2$, $z\geq2$, $W\geq1$, a lattice structure which includes one or more doping elements of Al, Si, Ti, Fe, Zr, Mg and Cr, wherein a doping concentration is $0.01\sim0.1$ mol/mol $Li_wMn_x(CoNi)_yO_z$, the weight of Mn≥the weight of 40% $Li_wMn_x(CoNi)_yO_z$, the content of Mn constitutes 60~90% of the total molar volume of Co+Ni+Mn, the grain size is between 7~20 micron, the XRD reveals that the high manganese polycrystalline anode material has two or more lattice structures selected from the group consisting of $LiMn_2O_4$, $LiCO_n(NiMn)_{1-n}O_2$, $LiNi_{0.8}Co_{0.2}O_2$, $LiCoO_2$, $LiNi_nMn_{1-n}O_2$, $LiMn_{2n}Ni_{2(1-n)}O_4$ and $LiNiO_2$, wherein the crystalline phase includes mixed state and intergrowth state, where $n<1$, the compaction density is 3.0~3.5 g cm³.

According to the preferred embodiment of the present invention, a preparation method of high manganese polycrystalline anode material is provided which comprises the following steps:

I. Preparation of Precursor and Formation of Single Crystalline Structure

1. Preparation of precursor: provide 0.3~1.2 mol of Li element in $Li_2CO_3$, LiAc or LiOH, disperse in 200~300 ml aqueous colloid of 2~5% polyethylene glycol with a rotational speed of 10~60 rin/min and a time period of 50~120 min to form a colloid, weight to obtain a quantity of cobalt-nickel-manganese compound, where the molar ratio of Mn to Ni+Co: 0.4~2.0:0.01~0.6, add the cobalt-nickel-manganese compound into the colloid and mixed uniformly with a speed of 50~60 rin/min for a time period of 10~30 min, drying directly under 150~600° C. for 2~15 hours, grind and disperse by ball milling at a speed of 1500~3000 rin/min for a time period of 2~30 min, obtain Li and Co—Ni—Mn crystalline precursor. The cobalt-nickel-manganese compound is hydroxy compound, oxalate or carbonate.

2. Formation of single crystalline structure: allow agglomeration of the crystalline precursor directly under 750~1000° C. for 4~15 hours, cooling naturally, ball mill grinding until the particle size D50=7~20 micron, obtain single crystalline compound of $LiMn_2O_4$, $LiCO_n(NiMn)_{1-n}O_2$, $LiNi_{0.8}Co_{0.2}O_2$, $LiCoO_2$, $LiNi_nMn_{1-n}O_2$, $LiMn_{2n}Ni_{2(1-n)}O_4$ or $LiNiO_2$, where $n<1$.

II. Formation of Polycrystalline Structure

Mix two or more single crystalline structure obtained above to form a mixture, where the content of Mn constitutes 60~90% of the total molar volume of Co+Ni+Mn, the speed is 100~150 rin/min and the time is 5~20 min, dissolve 0.01~0.1 mol doping element in soluble salt compound into 100~300 ml 30~60% ethanol solution, where the doping element includes one or more elements selected from the group of Al, Si, Ti, Fe, Zr Mg and Cr, add the mixture, mix uniformly with a speed of 60~100 rin/min and a time of 30~60 min, dry directly under 100~200° C. for 2~10 hours to complete the doping process, heat to 300~850° C. at a heating rate of 50~100° C./hr, allow activation for 2~10 hours such that an intergrowth structure is formed. Conduct ball milling grinding with a rotational speed of 1500~3000 rin/min and a time of 2~5 min to obtain the high manganese polycrystalline anode material. The high manganese polycrystalline anode material has a composition having a general formula of $Li_w Mn_x(CoNi)_yO_z$, where $x=0.5\sim1.9$, $y=0.1\sim0.6$, $x+y<2$, $z\geq2$, $W\geq1$, the lattice structure includes one or more doping elements of Al, Si, Ti, Fe, Zr, Mg and Cr, wherein the doping concentration is $0.01\sim0.1$ mol/mol $Li_wMn_x(CoNi)_yO_z$, the weight of Mn≥the weight of 40% $Li_wMn_x(CoNi)_yO_z$, the content of Mn constitutes 60~90% of the total molar volume of Co+Ni+Mn, the particle size is between 7~20 micron, the XRD of the high manganese polycrystalline anode material reveals two or more lattice structures selected from the group consisting of $LiMn_2O_4$, $LiCO_n(NiMn)_{1-n}O_2$, $LiNi_{0.8}Co_{0.2}O_2$, $LiCoO_2$, $LiNi_nMn_{1-n}O_2$, $LiMn_{2n}Ni_{2(1-n)}O_4$ and $LiNiO_2$, where $n<1$, the compaction density is 3.0~3.5 g cm³.

According to the preparation method of the present invention, the drying device: Box typed furnace from Yixing Qianjin Furnace Equipment Co. Ltd., model: KSF1100-V, the mixing process is carried by using a JJ series homogenizer from Langfang City Sheng Tong Machinery Co. Ltd., the grinding equipment: ball milling machine from Lianyungang Chunlong Experimental Equipment Company, model: SHQM, the grading equipment: Standard inspection test sieve from Xinxiang Tongyi Machinery Equipment Company, model: TY-200A. The Analytical instruments used: JSM6360 Scanning Electron Microscope from Japan Electronics, D/max-2200 pcXRD X-ray diffraction machine from Japan Rigaku, LS602 Laser Particle Size Analyzer from Zhuhai Omec-Tec, FZS4~4B Tap Density Apparatus from Beijing CISRI, Pioneer2002 surface analyzer, which are used for testing and analyzing the high manganese anode material prepared by the preparation method of the present invention.

According to the preferred embodiment of the present invention, the dynamic battery includes an anode, a cathode, a non-aqueous electrolyte, a membrane and a container. The anode includes an anode collector and an anode active substance which is coated on the anode collector, the anode active substance is $Li_wMn_x(CoNi)_yO_z$, where $x=0.5\sim1.9$, $y=0.1\sim0.6$, $x+y<2$, $z\geq2$, $W\geq1$, the lattice structure includes one or more doping elements of Al, Si, Ti, Fe, Zr, and Cr, wherein the doping concentration is $0.01\sim0.1$ mol/mol $Li_wMn_x(CoNi)_yO_z$, the weight of Mn≥the weight of 40% $Li_wMn_x(CoNi)_yO_z$, the content of Mn constitutes 60~90% of the total molar volume of Co+Ni+Mn, the particle size is between 7~20 micron, the XRD of the high manganese polycrystalline anode material reveals two or more lattice structures of $LiMn_2O_4$, $LiCO_n(NiMn)_{1-n}O_2$, $LiNi_{0.8}Co_{0.2}O_2$, $LiCoO_2$, $LiNi_nMn_{1-n}O_2$, $LiMn_{2n}Ni_{2(1-n)}O_4$ and $LiNiO_2$, wherein the crystalline phase includes mixed state and intergrowth state, where $n<1$. From SEM, the material is existed in mixed state polycrystalline structure. The intergrowth state of the crystalline structure is indicated through the peaks of XRD spectrum. The compaction density is 3.0~3.5 g/cm³, a discharge rate of 1C at 4.2~2.75V has an initial capacitance ≥115 mAh/g, an anode energy density ≥345 mAh/cm³ (anode energy density mAh/cm³=anode plate compaction density g/cm³× initial capacitance mAh/g), a capacity retention rate ≥80% with a discharge rate of 1C at 55° C. after 500 cycles, a negative result with no fire and no explosion when overcharged at 1C 10V, a capacity retention rate >80% with 25° C. after 1000 cycles, a capacitance ≥135 mAh/g with a charging voltage 4.3V at 1C, ≥140 mAh/g with a charging voltage 4.4V at 1C, a good performance for processing and the anode plate does not fall off.

The cathode includes a cathode collector and a cathode active substance coated onto the cathode collector. The membrane includes a pure insulating layer in solid state or a solid with conducting ability, which is used to separate the cathode from anode. The container is a body for the anode, the cathode, the membrane and the electrolyte.

Preparation of Anode: Mix the High Manganese Polycrystalline Anode Material $Li_wMn_x(CoNi)_yO_z$ prepared by the method of the present invention and a conductive carbon black which constitutes to 2.0~3.0% of mass ratio of the anode material with an adhesive PVDF which constitutes to 2.0~2.5% of the mass ratio to form a mixture material. Then, add N-methylpyrrolidone (NMP) based on a mass ratio of the mixture material to NMP of 1:0.9. Mix uniformly to form a paste material, apply the paste material onto the aluminum foil collector, dry and press into an electrode plate. Preparation of Cathode: Mix the Active Substance Mesocarbon Microbead Mcmb in intermediate state and a conductive agent S—P which constitutes to 2% of mass ratio of the active substance of the cathode material with an adhesive PVDF which constitutes to 10% of the mass ratio to form a mixture material. Then, add N-methylpyrrolidone (NMP) based on a mass ratio of the mixture material to NMP of 1:1. Mix uniformly to form a paste material, apply the paste material onto the aluminum foil collector, dry and press into an electrode plate. Membrane is PPPE composite material. Container includes an aluminum body which has an insulating layer and a battery cover which has an electrode passage for an electrode latch. Spot welding the anode and cathode plate into the electrode latch, insert the membrane, install a coil onto a coil machine and put it into the aluminum body, placing the latch to protrude outside the battery cover and sealing the electrode passage with glue. Welding and sealing the aluminum body and the battery cover tightly. Inject electrolyte which is a mixture having a mass ratio EC:DEC:DMC=1:1:1 under condition in which the relative humidity is less than 1.5%. The electrolyte is 1M lithium hexafluorophoshate. Seal after injection. The model of the battery is "square 053048".

The dynamic lithium-ion battery of the present invention is tested with charging-discharging testing which follows the testing method GB/T18287-2000 and is preformed in a BS-9360 series battery testing cube in Guangzhou Kinte Insusery Company Limited.

I. Preparation of Precursor and Formation of Single Crystalline Structure

Embodiment 1: provide 0.3 mol of Li element in $Li_2CO_3$, disperse in 300 ml aqueous colloid of 2% polyethylene glycol with a rotational speed of 50 rin/min and a time period of 10 min to form a colloid, obtain 0.1 mol nickel element in nickel carbonate and 0.8 mol manganese element in manganese carbonate and add into the colloid to mix uniformly with a speed of 60 rin/min for a time period of 10 min. Dry under 150° C. for 10 hours, grind and disperse by ball milling at a speed of 3000 rin/min for a time period of 2 min, obtain Li and Ni—Mn crystalline precursor 1.

Figure 2:
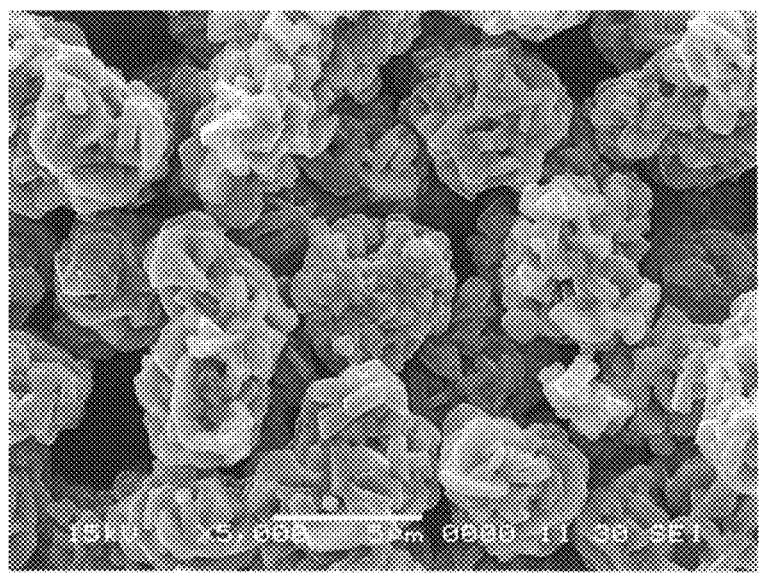
FIG. 2 is a scanning electron microscopy SEM image of the first embodiment according to the above preferred embodiment of the present invention.

Place the crystalline precursor under 850° C. for 7 hours. Cool naturally. Grind by ball milling until the particle size D50=12 micron. Obtain single crystalline compound A of $LiMn_{2n}Ni_{2(1-n)}O_4$, where n<1. As shown in FIG. 1, the lattice structure indicates a spinel structure. As shown in FIG. 2, it is a single crystalline structure.

Embodiment 2: provide 1 mol of Li element in LiOH, disperse in 300 ml aqueous colloid of 5% polyethylene glycol with a rotational speed of 60 rin/min and a time period of 70 min to form a colloid, obtain 0.1 mol cobalt element in cobalt oxalate, 0.45 mol nickel in nickel oxalate and 0.45 mol manganese element in manganese oxalate and add into the colloid to mix uniformly with a speed of 50 rin/min for a time period of 10 min. Dry under 450° C. for 10 hours, grind and disperse by ball milling at a speed of 2500 rin/min for a time period of 10 min, obtain Li and Co—Ni—Mn crystalline precursor 2.

Figure 3:
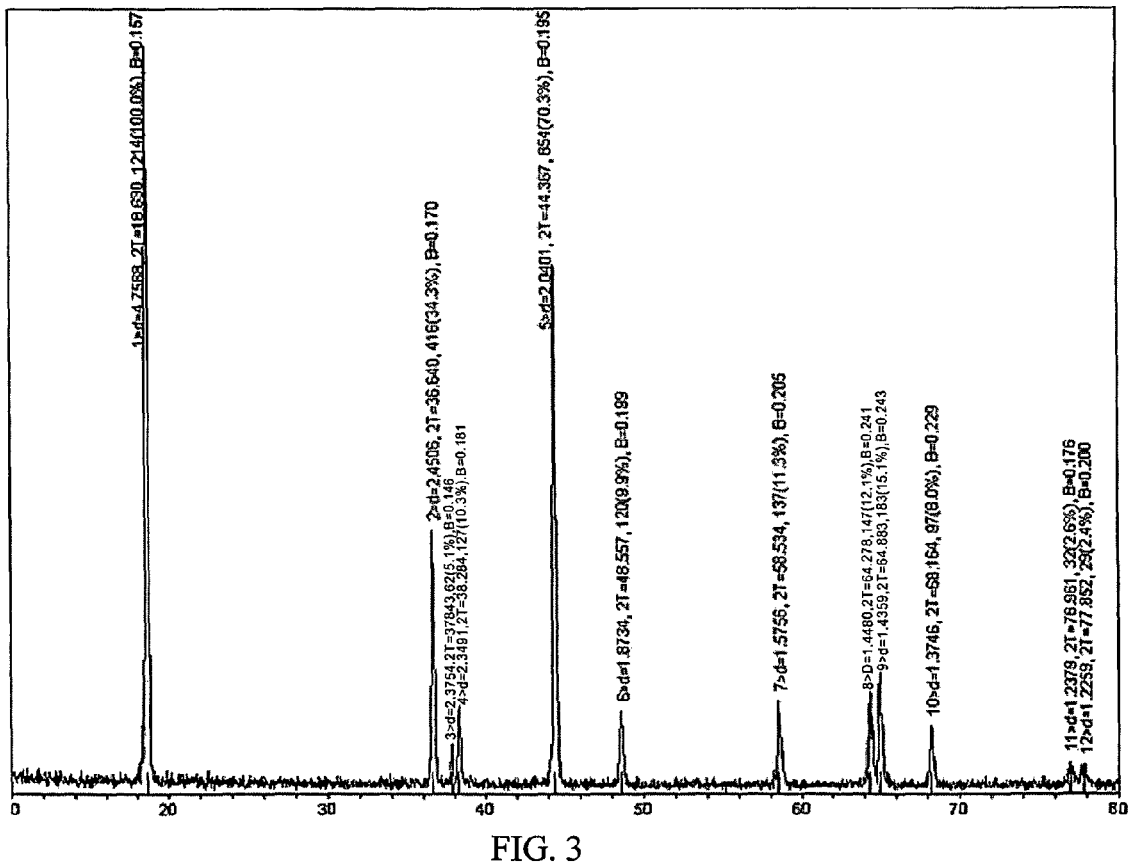
FIG. 3 is a spectrum showing an X-ray diffraction pattern according to a second embodiment of a preferred embodiment of the present invention.
Figure 4:
FIG. 4 is a scanning electron microscopy SEM image of the second embodiment according to the above preferred embodiment of the present invention.

Homogenize the crystalline precursor 2 under 920° C. for 10 hours. Cool naturally to room temperature. Grind by ball milling until the particle size D50=18 micron. Obtain single crystalline compound B of $LiCO_n(NiMn)_{1-n}O_2$, where n<1. As shown in FIG. 3, the lattice structure indicates a layered structure. As shown in FIG. 4, a single crystalline structure is shown.

Embodiment 3: provide 0.3 mol of Li element in $Li_2CO_3$, disperse in 200 ml aqueous colloid of 4% polyethylene glycol with a rotational speed of 50 rin/min and a time period of 120 min to form a colloid, obtain 0.06 mol nickel element in nickel carbonate and 1.0 mol manganese element in manganese carbonate and add into the colloid to mix uniformly with a speed of 50 rin/min for a time period of 20 min. Dry under 250° C. for 10 hours, grind and disperse by ball milling at a speed of 2000 rin/min for a time period of 15 min, obtain Li and Ni—Mn crystalline precursor 3.

Figure 5:
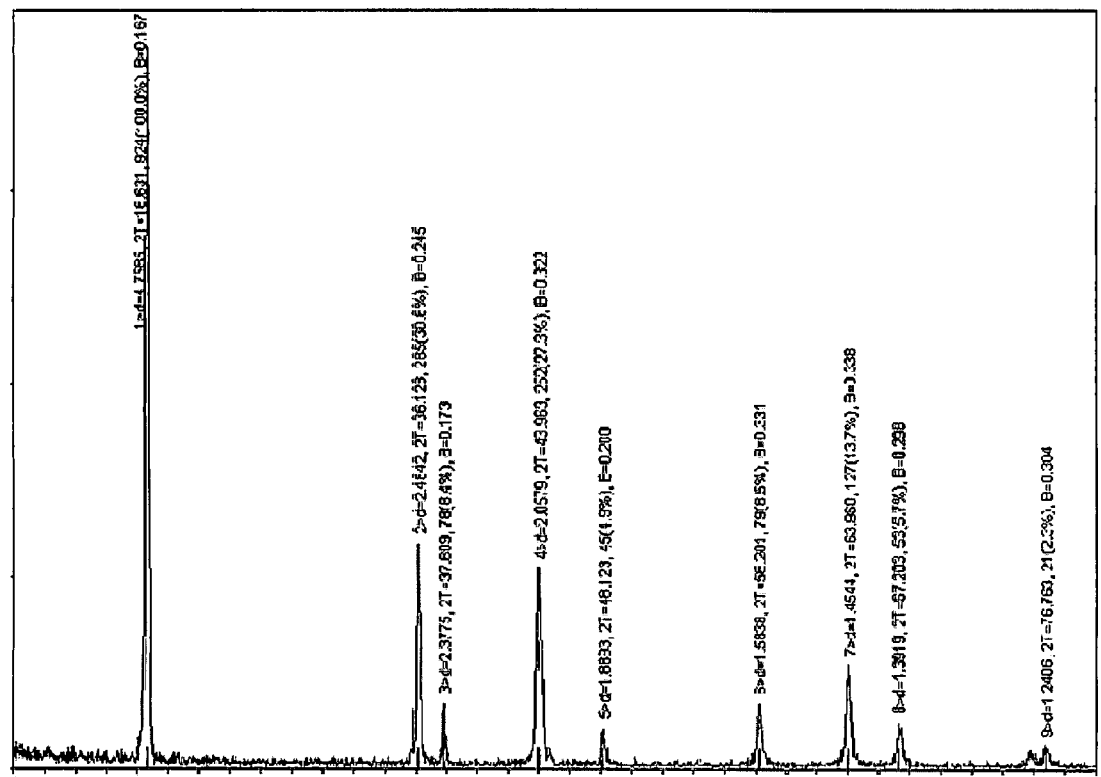
FIG. 5 is a spectrum showing an X-ray diffraction pattern according to a third embodiment of a preferred embodiment of the present invention.
Figure 6:
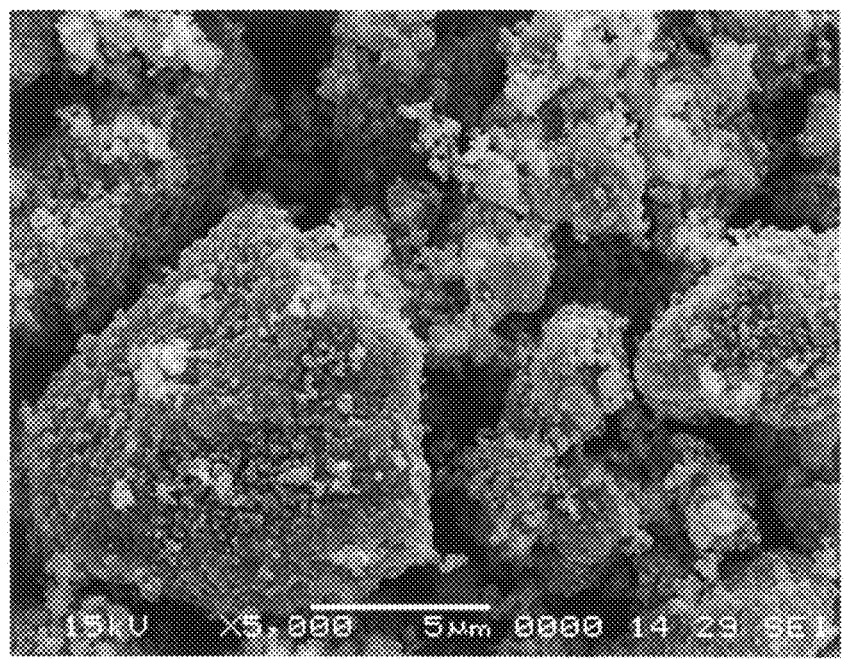
FIG. 6 is a scanning electron microscopy SEM image of the third embodiment according to the above preferred embodiment of the present invention.

Homogenize the crystalline precursor 3 under 750° C. for 15 hours. Cool naturally to room temperature. Grind by ball milling until the particle size D50=8 micron. Obtain single crystalline compound B of $LiMn_{2n}Ni_{2(1-n)}O_4$, where n<1. As shown in FIG. 5, the lattice structure indicates a spinel structure. As shown in FIG. 6, it is a single crystalline structure.

Embodiment 4: provide 0.6 mol of Li element in $Li_2CO_3$, disperse in 250 ml aqueous colloid of 3% polyethylene glycol with a rotational speed of 55 rin/min and a time period of 100 min to form a colloid, obtain 0.6 mol nickel element in nickel carbonate and 0.4 mol manganese element in manganese carbonate and add into the colloid to mix uniformly with a speed of 55 rin/min for a time period of 10 min. Dry under 600° C. for 2 hours, grind and disperse by ball milling at a speed of 1500 rin/min for a time period of 30 min, obtain Li and Ni—Mn crystalline precursor 4.

Figure 7:
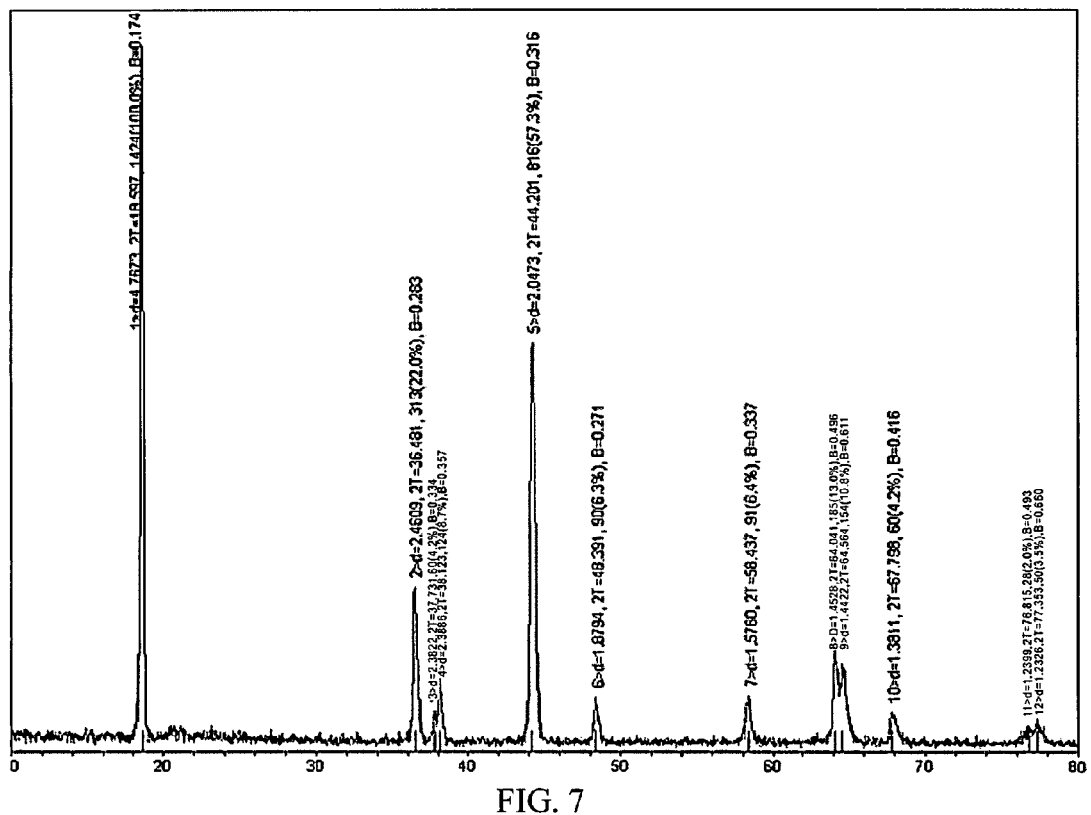
FIG. 7 is a spectrum showing an X-ray diffraction pattern according to a fourth embodiment of a preferred embodiment of the present invention.
Figure 8:
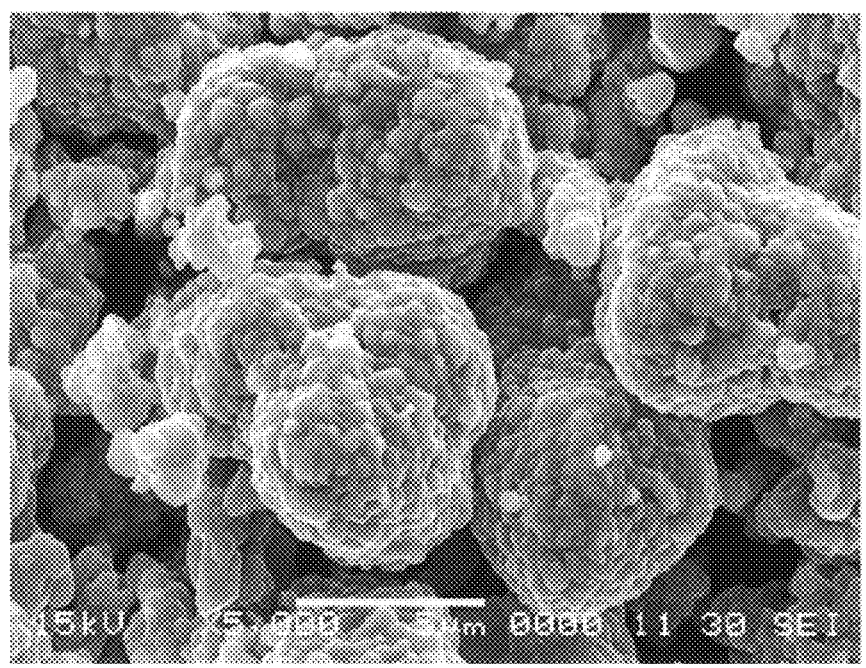
FIG. 8 is a scanning electron microscopy SEM image of the fourth embodiment according to the above preferred embodiment of the present invention.

Homogenize the crystalline precursor 4 under 1000° C. for 4 hours. Cool naturally to room temperature. Grind by ball milling until the particle size D50=16 micron. Obtain single crystalline compound D of $LiNi_nMn_{1-n}O_2$, where n<1. As shown in FIG. 7, the lattice structure indicates a layered structure. As shown in FIG. 8, it is a single crystalline structure.

Embodiment 5: provide 1.5 mol of Li element in $Li_2CO_3$, disperse in 200 ml aqueous colloid of 4% polyethylene glycol with a rotational speed of 50 rin/min and a time period of 90 min to form a colloid, obtain 0.01 mol nickel element in nickel carbonate and 3.0 mol manganese element in manganese carbonate and add into the colloid to mix uniformly with a speed of 50 rin/min for a time period of 30 min. Dry under 150° C. for 15 hours, grind and disperse by ball milling at a speed of 2000 rin/min for a time period of 15 min, obtain Li and Ni—Mn crystalline precursor 5.

Homogenize the crystalline precursor 5 under 800° C. for 15 hours. Cool naturally to room temperature. Grind by ball milling until the particle size D50=8 micron. Obtain single crystalline compound E of $LiMn_2Ni_{2(1-n)}O_4$, where n<1. As shown, the lattice structure indicates a spinel structure and a single crystalline structure.

II. Formation of Polycrystalline Structure

Figure 9:
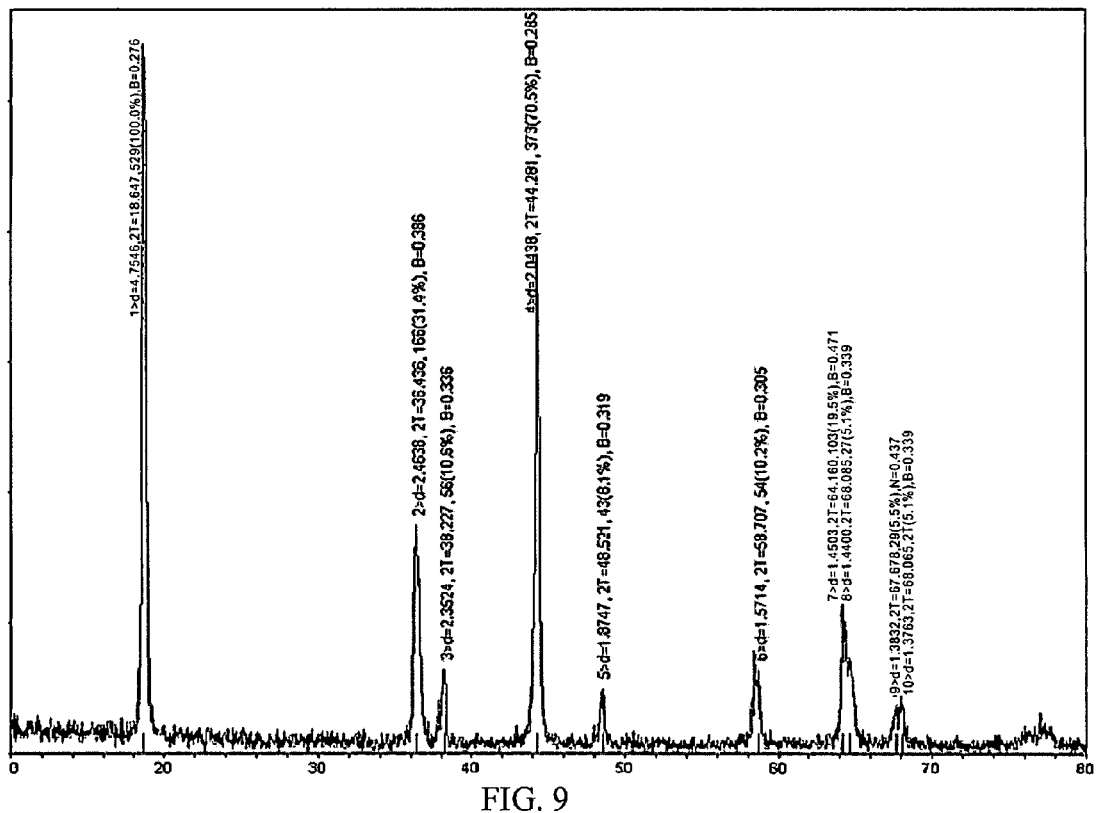
FIG. 9 is a spectrum showing an X-ray diffraction pattern according to a fifth embodiment of a preferred embodiment of the present invention.
Figure 10:
FIG. 10 is a scanning electron microscopy SEM image of the fifth embodiment according to the above preferred embodiment of the present invention.

Embodiment 6: mix single crystalline compound A and B to form a mixture, where the content of Mn constitutes 73.7% of the total molar volume of Co+Ni+Mn, the ball milling grinding speed is 100 rin/min and the time is 20 min. Dissolve 0.01 mol Al element in AlAc into 100 ml 50% ethanol solution, add the mixture, mix uniformly with a speed of 100 rin/min and a time of 30 min, dry under 100° C. for 10 hours, then heat to 850° C. at a heating rate of 100° C./hr for activation for 2 hours such that an intergrowth structure or a mixed state structure is formed. Conduct ball milling grinding with a rotational speed of 1500 rin/min and a time of 5 min to obtain the high manganese polycrystalline anode material. As shown in FIG. 9, the XRD reveals a $LiMn_{2n}Ni_{2(1-n)}O_4/LiCO_n$ $(NiMn)_{1-n}O_2$ intergrowth crystalline structure in which $Al^{3+}$ ion has a radius of 0.0535 nm which is smaller than that of $Li^{1+}$ which has a radius of 0.076 nm and replaces some of the Li-ion in the lattice structure under heating condition. Therefore Li-ions at the single crystal and different phases in the lattice structure are further dispersed. XRD peak features indicate a pattern which is different from a simple polycrystalline mixture in which peak 003 and 111 is basically overlapped, which is a characteristic of the existence of intergrowth structure. Referring to FIG. 10 of the drawings, the SEM image indicates a different crystal appearance which is different from that of a single crystal, which is a characteristic of the co-existence of different crystal appearance.

The high manganese polycrystalline material of embodiment 6 is used to prepare a rectangular Li-ion battery with model number 053048, application performance and electrical testing results are shown in Table 1.

Figure 11:
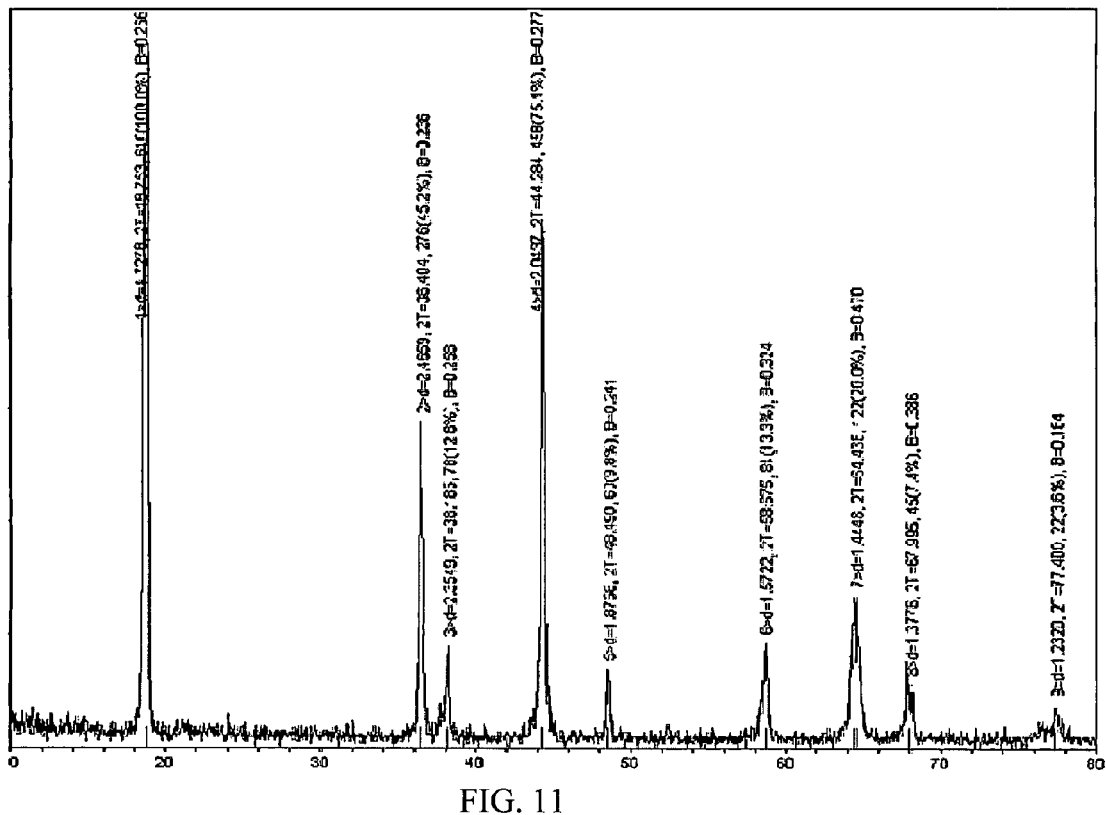
FIG. 11 is a spectrum showing an X-ray diffraction pattern according to a sixth embodiment of a preferred embodiment of the present invention.
Figure 12:
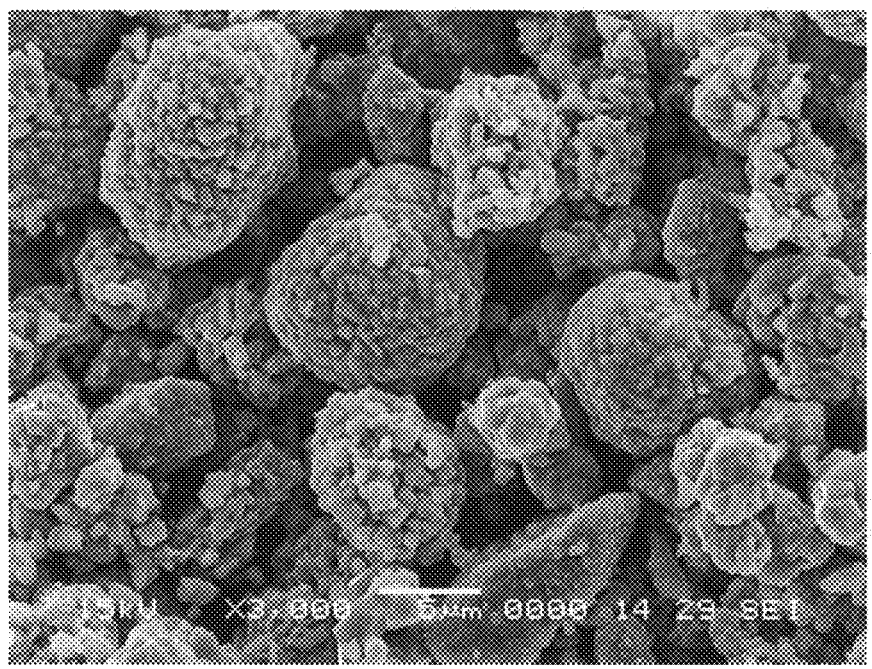
FIG. 12 is a scanning electron microscopy SEM image of the sixth embodiment according to the above preferred embodiment of the present invention.

Embodiment 7: mix single crystalline compound A, B and C to form a mixture, where the content of Mn constitutes 69.4% of the total molar volume of Co+Ni+Mn, the ball milling grinding speed is 150 rin/min and the time is 5 min. Dissolve 0.1 mol Mg element in MgAc into 100 ml 30% ethanol solution, add the mixture, mix uniformly with a speed of 60 rin/min and a time of 60 min, dry under 200° C. for 2 hours, then heat to 650° C. at a heating rate of 50° C./hr for activation for 5 hours such that an intergrowth structure is formed. Conduct ball milling grinding with a rotational speed of 3000 rin/min and a time of 2 min to obtain the high manganese polycrystalline anode material. As shown in FIG. 11, the XRD reveals a $LiMn_{2n}Ni_{2(1-n)}O_4/LiCO_n$ $(NiMn)_{1-n}O_2/LiMn_{2n}Ni_{2(1-n)}O_4$ intergrowth crystalline structure in which $Mg^{2+}$ ion has a radius of 0.072 nm which is smaller than that of $Li^{1+}$ which has a radius of 0.076 nm and replaces some of the Li ions in the lattice structure under heating condition. Therefore Li ions at the single crystal and different phases in the lattice structure are further dispersed. XRD peak features indicate a pattern which is different from a simple polycrystalline mixture in which peak 003 and 111 are basically overlapped, which is a characteristic of the existence of intergrowth structure. Referring to FIG. 12 of the drawings, the SEM image indicates different crystal appearance which is different from that of a single crystal, which is a characteristic of the co-existence of different crystal appearance.

The high manganese polycrystalline material of embodiment 7 is used to prepare a rectangular Li-ion battery with model number 053048, application performance and electrical testing results are shown in Table 1.

Figure 13:
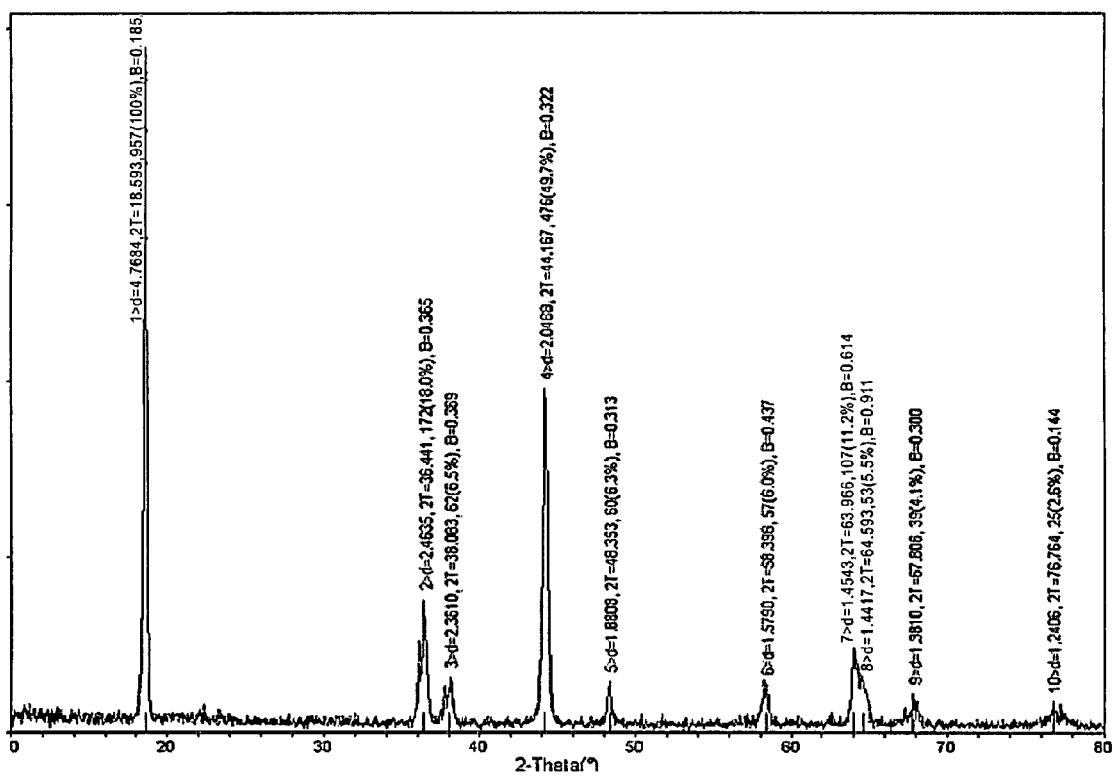
FIG. 13 is a spectrum showing an X-ray diffraction pattern according to a seventh embodiment of a preferred embodiment of the present invention.
Figure 14:
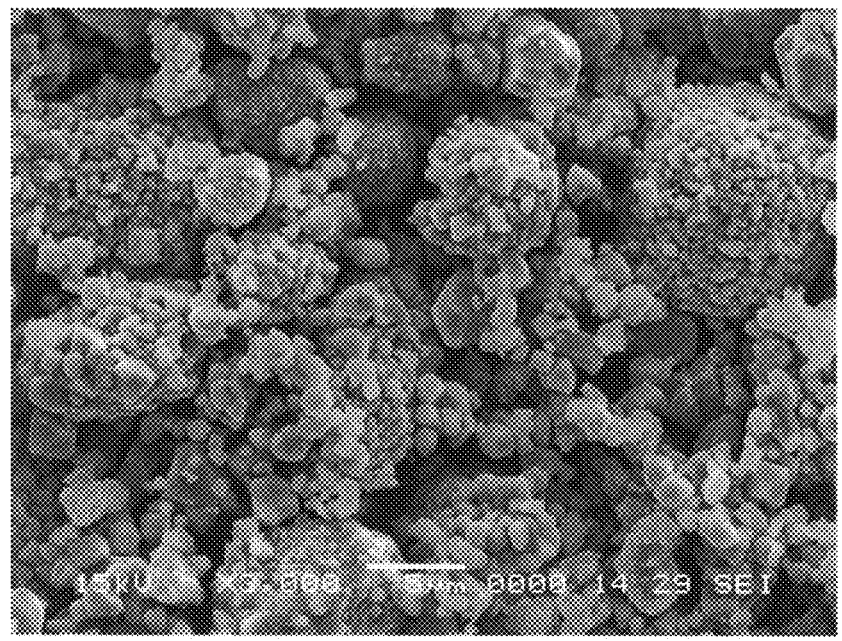
FIG. 14 is a scanning electron microscopy SEM image of the seventh embodiment according to the above preferred embodiment of the present invention.

Embodiment 8: mix single crystalline compound D and C to form a mixture, where the content of Mn constitutes 60.3% of the total molar volume of Co+Ni+Mn, the ball milling grinding speed is 120 rin/min and the time is 10 min. Dissolve 0.01 mol Al element in AlAc into 300 ml 60% ethanol solution, add the mixture, mix uniformly with a speed of 70 rin/min and a time of 40 min, dry under 110° C. for 10 hours, then heat to 300° C. at a heating rate of 70° C./hr for activation for 7 hours. Then, an intergrowth structure is formed. Conduct ball milling grinding with a rotational speed of 2000 rin/min and a time of 3 min to obtain the high manganese polycrystalline anode material. As shown in FIG. 13, the XRD reveals a $LiMn_{2n}Ni_{2(1-n)}O_4/LiNi_nMn_{1-n}O_2$ intergrowth polycrystalline structure in which $Al^{3+}$ ion has a radius of 0.0535 nm which is smaller than that of $Li^{1+}$ which has a radius of 0.076 nm and replaces some of the Li ions in the lattice structure under heating condition. Therefore Li ions at the single crystal and different phases in the lattice structure are further dispersed. XRD peak features indicate a pattern which is different from a simple polycrystalline mixture in which peak 003 and 111 are basically overlapped, which is a characteristic of the existence of intergrowth structure. Referring to FIG. 14 of the drawings, the SEM image indicates different crystal appearance which is different from that of a single crystal, which is a characteristic of the co-existence of different crystal appearance.

The high manganese polycrystalline material of embodiment 7 is used to prepare a rectangular Li-ion battery with model number 053048, application performance and electrical testing results are shown in Table 1.

Figure 15:
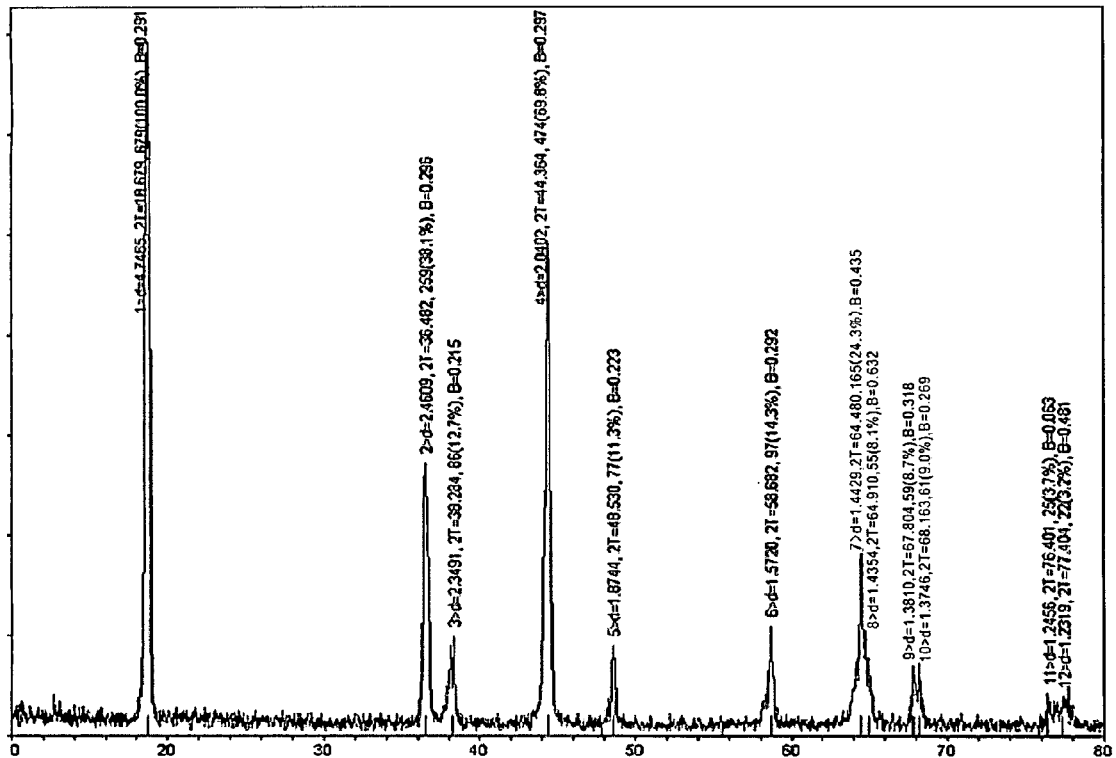
FIG. 15 is a spectrum showing an X-ray diffraction pattern according to an eighth embodiment of a preferred embodiment of the present invention.
Figure 16:
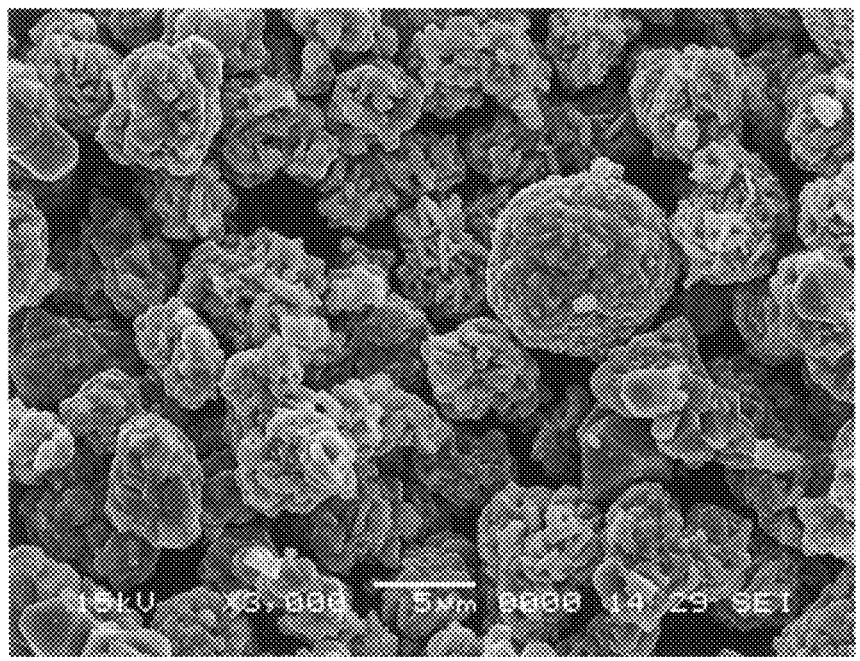
FIG. 16 is a scanning electron microscopy SEM image of the eighth embodiment according to the above preferred embodiment of the present invention.

Embodiment 9: mix single crystalline compound A, B and D to form a mixture, where the content of Mn constitutes 80.3% of the total molar volume of Co+Ni+Mn, the ball milling grinding speed is 135 rin/min and the time is 20 min. Dissolve 0.06 mol Cr element in $Cr(CH_3COO)_3$ into 100 ml 50% ethanol solution, add the mixture, mix uniformly with a speed of 90 rin/min and a time of 50 min, dry under 190° C. for 3 hours, then heat to 500° C. at a heating rate of 85° C./hr for activation for 3 hours. Then, an to intergrowth structure is formed. Conduct ball milling grinding with a rotational speed of 1600 rin/min and a time of 3 min to obtain the high manganese polycrystalline anode material. As shown in FIG. 15, the XRD reveals a $LiMn_{2n}Ni_{2(1-n)}O_4/LiCO_n$ $(NiMn)_{1-n}O_2/LiNi_nMn_{1-n}O_2$ intergrowth polycrystalline structure in which $Cr^{3+}$ ion has a radius of 0.0615 nm which is similar to $Mn^{3+}$ (0.064 nm) and replaces some of the Li ions in the lattice structure under heating condition. Therefore Li ions at the single crystal and different phases in the lattice structure are further dispersed. XRD peak features indicate a pattern which is different from a simple polycrystalline mixture in which peak 003 and 111 are basically overlapped, which is a characteristic of the existence of intergrowth structure. Referring to FIG. 16 of the drawings, the SEM image indicates different crystal appearance which is different from that of a single crystal, which is a characteristic of the co-existence of different crystal appearance.

The high manganese polycrystalline material of embodiment 7 is used to prepare a rectangular Li-ion battery with model number 053048, application performance and electrical testing results are shown in Table 1.

Figure 17:
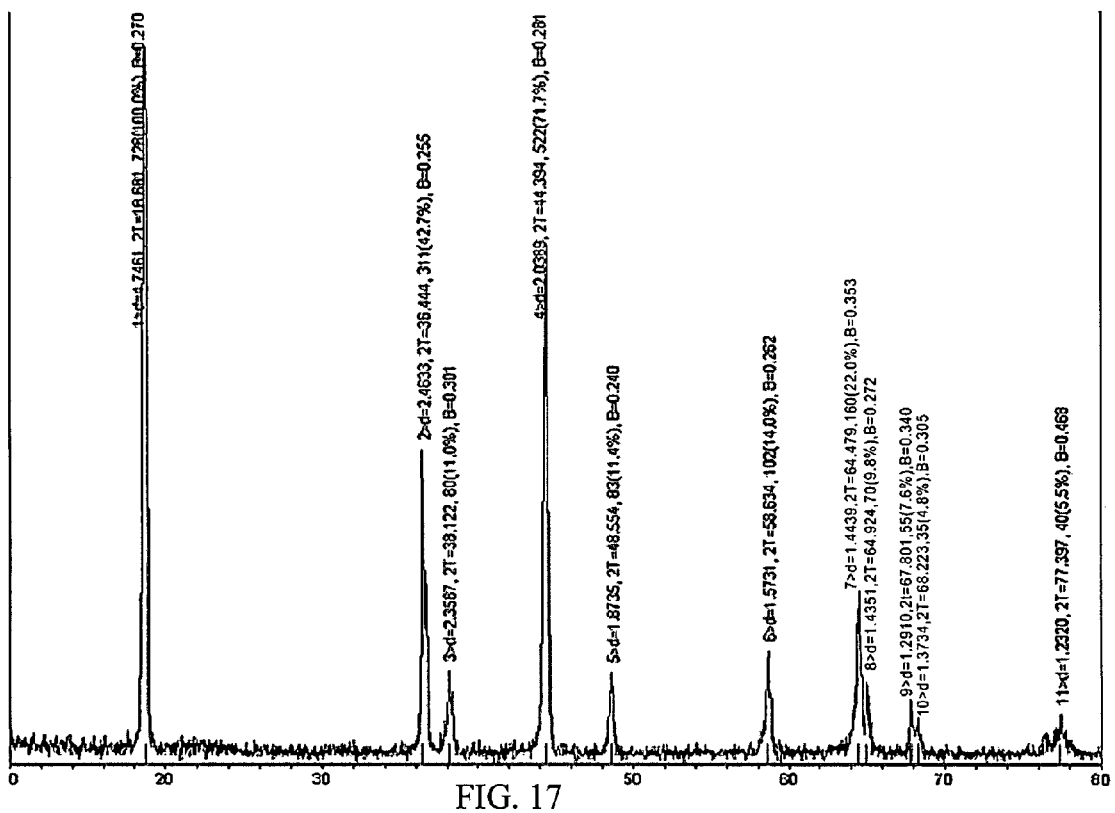
FIG. 17 is a spectrum showing an X-ray diffraction pattern according to a ninth embodiment of a preferred embodiment of the present invention.
Figure 18:
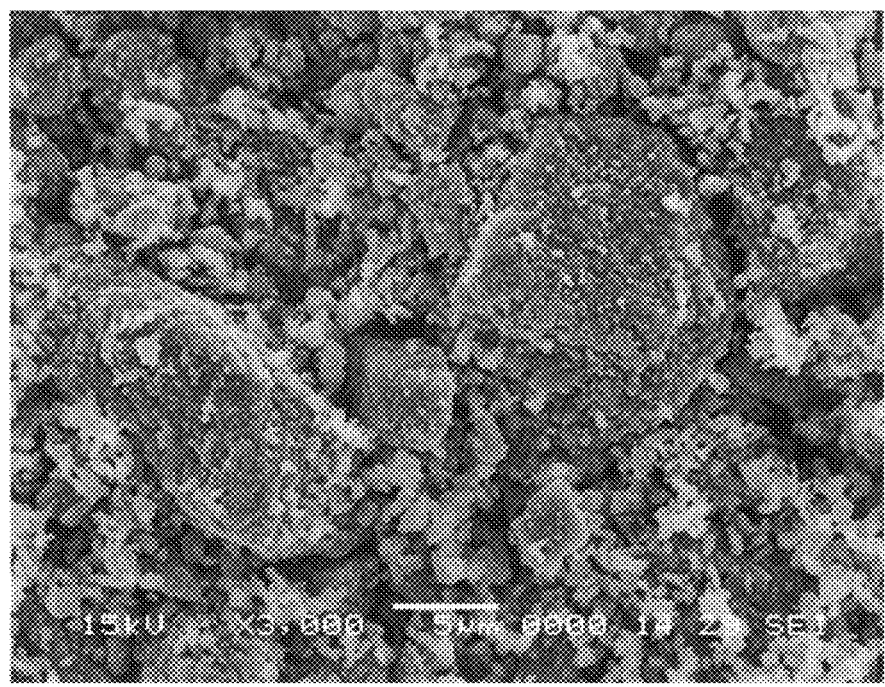
FIG. 18 is a scanning electron microscopy SEM image of the ninth embodiment according to the above preferred embodiment of the present invention.

Embodiment 10: mix single crystalline compound B and C to form a mixture, where the content of Mn constitutes 89.2% of the total molar volume of Co+Ni+Mn, the ball milling grinding speed is 140 rin/min and the time is 20 min. Dissolve 0.06 mol Zr element in $Zr(NO_3)_4$ into 100 ml 50% ethanol solution, add the mixture, mix uniformly with a speed of 85 rin/min and a time of 45 min, dry under 150° C. for 3 hours, then heat to 600° C. at a heating rate of 100° C./hr for activation for 4 hours. Then, an intergrowth structure is formed. Conduct ball milling grinding with a rotational speed of 1500 rin/min and a time of 5 min to obtain the high manganese polycrystalline anode material. As shown in FIG. 17, the XRD reveals a $LiCO_n(NiMn)_{1-n}O_2/LiMn_{2n}Ni_{2(1-n)}O_4$ intergrowth polycrystalline structure in which $Zr^{4+}$ ion has a radius of 0.072 nm which is smaller than that of $Li^{1+}$ which has a radius of 0.076 nm and replaces some of the Li ions in the lattice structure under heating condition. Therefore Li ions at the single crystal and different phases in the lattice structure are further dispersed. XRD peak features indicate a pattern which is different from a simple polycrystalline mixture in which peak 003 and 111 are basically overlapped, which is a characteristic of the existence of intergrowth structure. Referring to FIG. 18 of the drawings, the SEM image indicates different crystal appearance which is different from that of a single crystal, which is a characteristic of the co-existence of different crystal appearance.

The high manganese polycrystalline material of embodiment 10 is used to prepare a rectangular Li-ion battery with model number 053048, application performance and electrical testing results are shown in Table 1.

In the embodiment 1-5, cobalt, nickel and manganese compounds utilize the hydroxy group of cobalt, nickel and manganese carbonate and cobalt, nickel and manganese oxalate which have similar physical and chemical properties to carbonate, wherein cobalt, nickel and manganese belong to transition elements and have a radius (0.053~0.06 nm) which are similar to each others. The valence number the different compounds are the same, which is +2, an intergrowth structure can be formed and similar chemical properties is provided to $Li^+$ dispersion. According to the preparation of precursor of the present invention, contributory effect is provided to the formation of Li and Co, Ni, Mn precursor which is the common and basic element skeleton of the lattice. Therefore, compounds of hydroxyl or oxalate of cobalt, nickel and manganese elements are suitable for preparing the precursor of Li and Co+Ni+Mn.

In embodiment 6-10, exemplary doping elements of the lattice structure are Al and Mg, while an ion radius of Si, Ti, Fe, Zr, Cr with Al and Mg, (ion radius of 0.04~0.067 nm) is smaller than the ion radius of $Li^+$ (0.076 nm), and is approximate the same as the radius of $Mn^{3+}$ (0.0645 nm), Li ion is substituted under certain heating condition and crystalline structure in solid state is formed. The doping material in the lattice structure according to the preferred embodiment of the present invention can have inhibit effect on the conversion between $Mn^{3+}$ to $Mn^{2+}+Mn^{4+}$. The use of more than one doping elements can inhibit the change of phase, balance the electric charge balance between different phases, increase temperature resistance of the material, decrease the self-discharging effect, increase safety level in increasing stability under high temperature, etc. Accordingly, the material is suitable for use in the preferred embodiment of the present invention.

Figure 19:
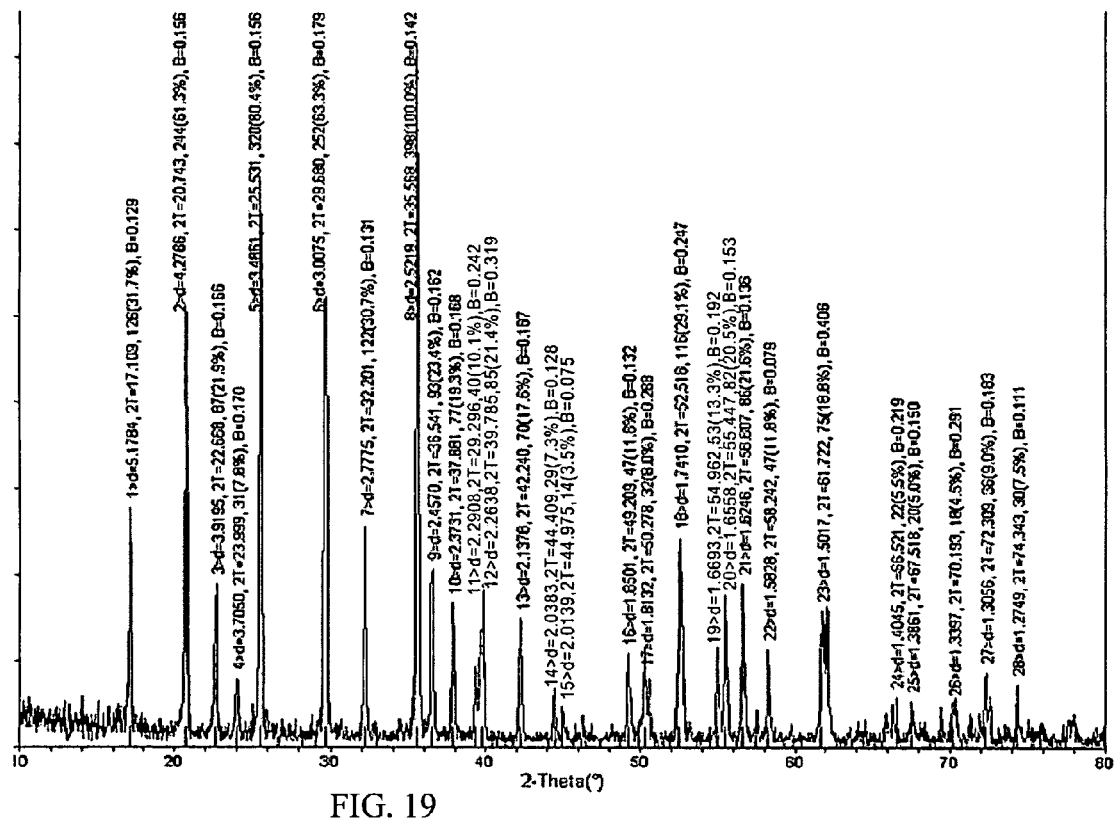
FIG. 19 is a spectrum showing an X-ray diffraction pattern of a contrast embodiment 1 of the present invention.
Figure 20:
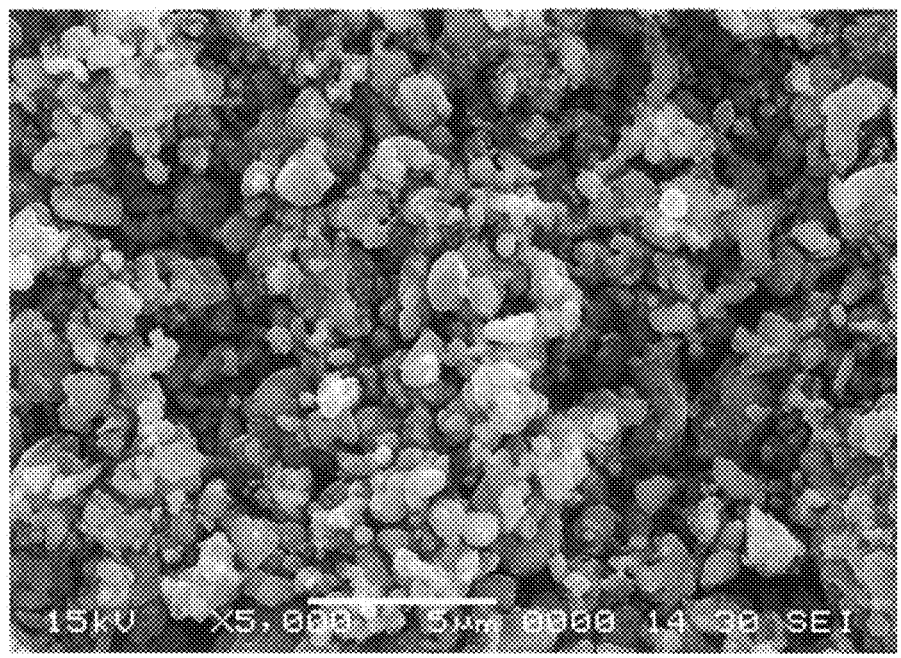
FIG. 20 is a scanning electron microscopy SEM image of the above contrast embodiment 1 of the present invention.

Contrast embodiment 1: As shown in FIG. 19, anode material of lithium iron phosphate ZHFe1# from Shenzhen Zhenhua New Material Incorporation is tested and the lattice structure which is revealed by XRD indicates a pattern which is a single olivine lithium iron phosphate structure. As shown in FIG. 20, the SEM image indicates a single crystal particle size of <1 μm characterizing an evenly distributed pattern. The anode material of this contrast embodiment 1 is used to prepare a rectangular Li-ion battery with model number 053048, application performance and electrical testing results are shown in Table 1.

Figure 21:
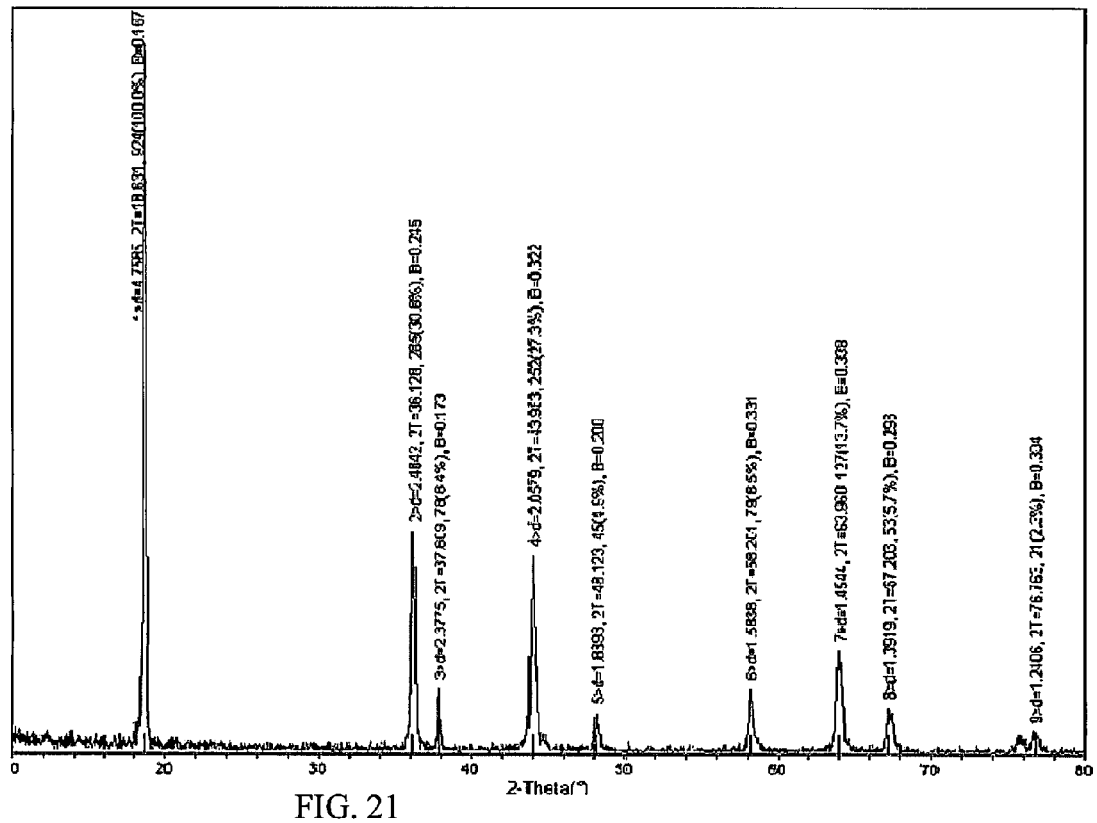
FIG. 21 is a spectrum showing an X-ray diffraction pattern of a contrast embodiment 2 of the present invention.
Figure 22:
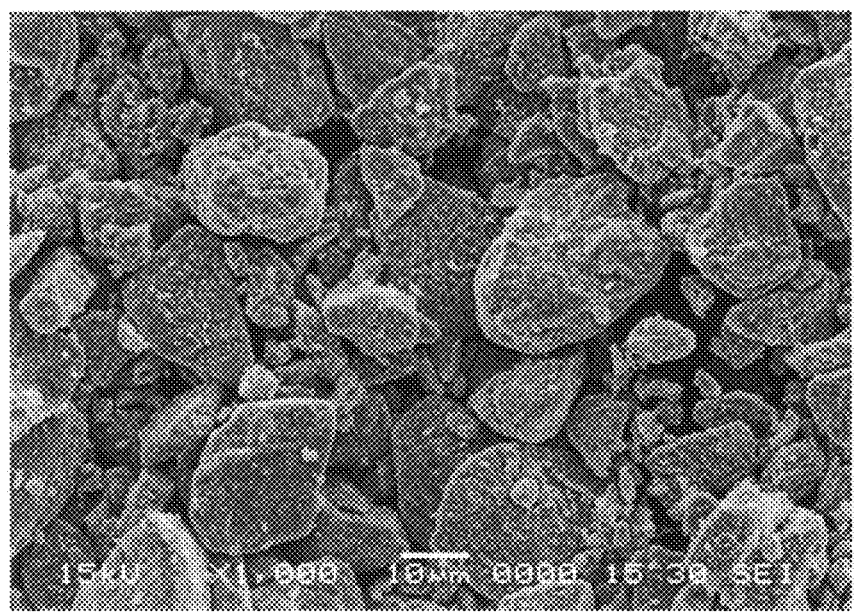
FIG. 22 is a scanning electron microscopy SEM image of the above contrast embodiment 2 of the present invention.

Contrast embodiment 2: As shown in FIG. 21, anode material of lithium manganese ZHM01# from Shenzhen Zhenhua New Material Incorporation is tested and the lattice structure which is revealed by XRD indicates a pattern which is a single spinel structure of lithium manganese. As shown in FIG. 22, the SEM image indicates a particle size of <1 μm characterizing single crystals in aggregated state which has a relative low surface area of 0.6~0.9 $m^2$/g. The anode material of this contrast embodiment 2 is used to prepare a rectangular Li-ion battery with model number 053048, application performance and electrical testing results are shown in Table 1.

Conclusion: the high manganese polycrystalline anode material of the present invention has a compaction density (3.0~3.5 g/$cm^3$) which is higher than that of the lithium manganese (2.9~3.3 g/$cm^3$) and the lithium iron phosphate (2.1~2.5 g/$cm^3$); a capacity (≥115 mAh/g) which is higher than that of the lithium manganese (95~110 mAh/g) but lower than that of the lithium iron phosphate (~130 mAh/g). Accordingly, the high manganese polycrystalline material has higher energy density than the lithium manganese and the lithium iron phosphate. Olivine lithium iron phosphate has characteristics of a low voltage of 3.4V (vs. $Li/Li^+$), a single crystal particle size (≤1 μm) which is small in its powder form, a surface area (12~20 $cm^2$/g) which is great and a compaction density (≤1.2 g/$cm^3$) which is low, therefore having a relative low compaction density and energy density. Spinel lithium manganese has a Li—Mn—O structure, can be varied to form different compounds and is capable of conversion under different conditions, therefore the crystal state can be changed easily during the charging and discharging process and encounter high rate of capacity loss. The high manganese polycrystalline material of the present invention has multi-elements and polycrystalline structure which overcomes the problem of the lithium manganese structure. Accordingly, the capacity and stability are both higher than that of the lithium manganese. On the other hand, its safety level is about the same as that of the lithium iron phosphate and the lithium manganese while its cycle performance under high temperature is much higher than that of the lithium manganese and is about the same as that of the lithium iron phosphate, and its cycle performance under room temperature is much higher than that of the lithium manganese and is about the same as that of the lithium iron phosphate. In conclusion, the high manganese polycrystalline anode material according to the preferred embodiment of the present invention has superior performance in energy density while maintaining high safety level, therefore it is the ideal anode material for dynamic battery.

Table 1 is Ihe testing data of exemplary embodiment 5-9 and contrast embodiment 1-2. Battery model: 053048, charging voltage 4.2~2.75V, charging rate 1 C.

| Anode Material | Compaction density (g/$cm^3$) | Initial capacity (mAh/g) | Anode energy density (mAh/$cm^3$) | Capacity retention rate at 25° C. & 300 cycles (%) | Capacity retention rate at 25° C. & 1000 cycles (%) | Capacity retention rate at 55° C. & 500 cycles (%) | Overcharge testing at 1 C 10 V |
|---|---|---|---|---|---|---|---|
| $LiMn_{2n}Ni_{2(1-n)}O_4$/ $LiCo_n(NiMn)_{1-n}O_2$ high manganese anode material of embodiment 6 | 3.2 | 126.2 | 403.84 | 91.4 | 82.4 | 83.0 | no burning, no explosion |
| $LiMn_{2n}Ni_{2(1-n)}O_4$/ $LiCo_n(NiMn)_{1-n}O_2$/ $LiMn_{2n}Ni_{2(1-n)}O_4$ high manganese anode material of embodiment 7 | 3.3 | 126.5 | 417.45 | 93.8 | 85.2 | 83.2 | |

| Anode Material | Compaction density (g/cm³) | Initial capacity (mAh/g) | Anode energy density (mAh/cm³) | Capacity retention rate at 25° C. & 300 cycles (%) | Capacity retention rate at 25° C. & 1000 cycles (%) | Capacity retention rate at 55° C. & 500 cycles (%) | Overcharge testing at 1 C 10 V |
|---|---|---|---|---|---|---|---|
| $LiMn_{2n}Ni_{2(1-n)}O_4$ high manganese anode material of embodiment 8 | 3.1 | 117.2 | 363.32 | 92.5 | 83.1 | 86.4 | |
| $LiMn_{2n}Ni_{2(1-n)}O_4$/$LiCo_n(NiMn)_{1-n}O_2$/$LiNi_nMn_{1-n}O_2$ high manganese anode material of embodiment 9 | 3.2 | 125.0 | 400.00 | 93.8 | 83.3 | 82.3 | |
| $LiCo_n(NiMn)_{1-n}O_2$/$LiMn_{2n}Ni_{2(1-n)}O_4$ high manganese anode material of embodiment 10 | 3.0 | 118.2 | 354.60 | 95.1 | 85.3 | 84.8 | |
| lithium iron phosphate $LiFePO_4$ of contrast embodiment 1 | 2.4 | 130.8 | 313.92 | 95.7 | 90.2 | 88.7 | |
| lithium manganese $LiMn_2O_4$ of contrast embodiment 2 | 3.0 | 104.6 | 313.80 | 90.3 | 73.1 | 65.5 | |

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A preparation method of high manganese polycrystalline anode material, comprising the steps of: (a) preparing a precursor: dispersing 0.3~1.2 mol of Li element in $Li_2CO_3$, LiAc or LiOH into 200~300 ml aqueous colloid of 2~5% polyethylene glycol to form a colloid in which a first preset speed is 10~60 rin/min and a first preset time is 50~120 min; adding cobalt-nickel-manganese compound into said colloid, where a molar ratio of Mn to Ni+Co is 0.4~2.0:0.01~0.6, a second preset speed is 50~60 rin/min and a second preset time is 10~30 min; drying under 150~600° C. for 2~15 hours to obtain said precursor which has a crystalline form and contains Li and Co—Ni—Mn, where a third preset speed is 1500~3000 rin/min and a third preset time is 2~30 min; (b) forming a single crystalline structure: heating said precursor under 750~1000° C. for 4~15 hours for allowing agglomeration of said precursor; cooling; breaking until a particle size D D50=7~20 micron is obtained; obtaining a single crystal compound of $LiMn_2O_4$, $LiCo_n(NiMn)_{1-n}O_2$, $LiNi_{0.8}Co_{0.2}O_2$, $LiCoO_2$, $LiNi_nMn_{1-n}O_2$, $LiMn_{2n}Ni_{2(1-n)}O_4$ or $LiNiO_2$, where n<1; (c) forming a polycrystalline structure: mixing two or more said single crystal compounds to form a mixture, where a content of Mn constitutes 60~90% of a total molar volume of Co+Ni+Mn, a fourth preset speed is 100~150 rin/min and a fourth preset time is 5~20 min; dissolving 0.01~0.1 mol soluble salt containing one or more elements from the group consisting of Al, Si, Ti, Fe, Zr Mg and Cr into 100~300 ml 30~60% ethanol solution; adding said mixture; mixing under a fifth preset speed of 60~100 rin/min and a fifth preset time of 30~60 min; drying under 100~200° C. for 2~10 hours; heating to 300~850° C. at a heating rate of 50~100° C./hr for activation for 2~10 hours to obtain said polycrystalline structure having a mixed state or an intergrowth state.

2. The preparation method of high manganese polycrystalline anode material, as recited in claim 1, wherein said intergrowth state of said polycrystalline structure is crushed.

3. The preparation method of high manganese polycrystalline anode material, as recited in claim 1, wherein said polycrystalline structure having said mixed state and said intergrowth state is crushed with a rotational speed of 1500~3000 rin/min for 2~5 min.

4. The preparation method of high manganese polycrystalline anode material, as recited in claim 3, wherein said cobalt-nickel-manganese compound is hydroxy, oxalate or carbonate compound.

5. The preparation method of high manganese polycrystalline anode material, as recited in claim 4, said precursor carries out agglomeration under 750~1000° C. for 4~15 hours, which is then cooled naturally.

* * * * *